Patented Aug. 26, 1947

2,426,465

UNITED STATES PATENT OFFICE 2,426,465

METHOD OF PREPARING N-VINYL CARBAZOLE

Harry F. Miller and Ralph G. Flowers, Pittsfield, Mass., assignors to General Electric Company, a corporation of New York No Drawing. Application November 27, 1945, Serial No. 631,212

7 Claims. (Cl. 260—315)

This invention relates to the preparation of a vinyl compound and more particularly to a new and improved method of preparing N-vinylcarbazole.

The method of producing N-vinylcarbazole heretofore employed usually consisted in effecting reaction between carbazole and acetylene at a temperature above 100° C., most favorably between 100° and 250° C., in the presence of one or more catalysts, for example a substance selected from the class consisting of the alkali metals and strongly reacting alkali-metal compounds and a second substance selected from the class consisting of zinc, zinc compounds, ammonia and tertiary heterocyclic bases.

The present invention is based on our discovery of a relatively simple and economical method whereby N-vinylcarbazole can be prepared readily and in high yields by pyrolyzing, e. g., by heating at a temperature within the range of about 450° to about 750° C., a compound corresponding to the general formula (I) 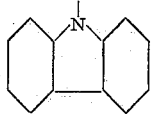

where R represents a member of the class consisting of acetyl (CH₃CO—), phenylacetyl (C₆H₅CH₂CO—), propionyl (CH₃CH₂CO—), butyryl (CH₃CH₂CH₂CO—) and isobutyryl

[(CH₃)₂CHCO—]

radicals. Specific examples of compounds embraced by the above formula are N-(β-acetoxyethyl) carbazole, N-(β-phenylacetoxyethyl) carbazole, N-(β-propionoxyethyl) carbazole, N-(β-n-butyroxyethyl) carbazole and N-(β-isobutyroxyethyl) carbazole, the last two compounds being embraced by the generic expression "an N-(β-butyroxyethyl) carbazole."

The N-substituted carbazoles which are pyrolyzed or thermally decomposed to yield N-vinylcarbazole in practicing our invention, as well as methods of preparing the same, are more fully described and specifically claimed in our copending application Serial No. 631,211, filed concurrently herewith and assigned to the same assignee as the present invention. These N-substituted carbazoles are esters of N-(β-hydroxyethyl) carbazole, more particularly the acetate, phenylacetate, propionate, n-butyrate or isobutyrate thereof.

The pyrolysis of a compound of the kind embraced by Formula I so as to obtain N-vinylcarbazole is effected by heating the compound to an elevated temperature, more particularly to a temperature of approximately 450° to 750° C., and specifically about 500° to 700° C. Thus, the present invention provides a method of preparing N-vinylcarbazole which comprises heating, for example, N-(β-acetoxyethyl) carbazole, alone or admixed with an inert gaseous diluent, at a temperature within the aforementioned ranges, for instance about 500° or 550° C. to about 700° or 750° C., and preferably, when N-(β-acetoxyethyl) carbazole is used, at a temperature of about 575° to 600° C. The products obtained by thus thermally decomposing the ester include N-vinylcarbazole and an acid corresponding to the ester employed. Part of the acid formed during the pyrolysis usually is decomposed into carbon dioxide, water and other products.

Either batch or continuous procedures may be employed, although we prefer to effect pyrolysis by passing the ester (advantageously while admixed with an inert gaseous or vaporous diluent, e. g., nitrogen, argon, helium, carbon dioxide, water vapor, etc.) continuously through a reaction zone maintained at a temperature within the ranges given in the preceding paragraph.

Any suitable type of apparatus may be employed. A simple, straight tube formed of inert, impervious material may be used as the chamber in which pyrolysis is effected. The tube may be in a vertical, a horizontal or an inclined position. It may be heated in any convenient manner, for example by being placed in an electrically or otherwise heated furnace suitably provided with effective means for controlling the temperature of pyrolysis. Vaporization and thermal decomposition of the ester take place in a relatively short period of time at the aforementioned temperatures, the lower temperatures requiring a longer time interval. The temperature of pyrolysis depends upon such influencing factors as, for example, the particular ester undergoing pyrolysis, the kind of reaction chamber or vessel employed, the rate at which the ester is passed through the reaction zone, and similar influencing factors. Thermal decomposition generally is effected at atmospheric presure, although in some cases pressures above or below atmospheric may be employed to advantage.

The products of pyrolysis and any undecomposed ester are condensed. When a continuous process is employed, using for example a tube as a reaction chamber, at least some condensation ordinarily takes place as the pyrolysis products and undecomposed ester pass from the hotter portions (where pyrolysis occurs) to the cooler portions of the tube. Further condensation may be effected, if necessary, by any suitable cooling means, for instance by collecting the products passing from the exit end of the tube in a cooled receiver. The N-vinylcarbazole is separated from other products and any undecomposed ester by any suitable means, e. g., by distillation under vacuum or by recrystallization from a suitable solvent, e. g., ethyl alcohol. If separation is by distillation technique, the distillation under vacuum may be continued to obtain any undecomposed ester, which thereafter may be returned to the reaction zone to yield more N-vinylcarbazole.

In order that those skilled in the art better may understand how the present invention may be carried into effect, the following examples are given by way of illustration and not by way of limitation.

*Example 1*

N-(β-acetoxyethyl) carbazole, which was produced as described in Example 2 of our aforementioned application Serial No. 631,211, was pyrolyzed by passing it slowly through an unpacked, inclined quartz tube, the middle portion of which was heated to 575° to 600° C. The tube was about 2 feet long and had an inside diameter of about ¾ inch. The molten ester (M. P. 71.5°–73.0° C.) was introduced into the somewhat cooler inlet end of the tube at the rate of about 1 to 2 cc. per minute. As it progressed toward the hotter zone it vaporized and then was pyrolyzed as it passed through the hotter portion of the tube. The products of pyrolysis were collected as a condensate in a cooled receiver. The condensate containing mainly N-vinylcarbazole was dissolved in hot ethyl alcohol. Pure N-vinylcarbazole crystallized from this solution, upon cooling, in the form of plates. These plates gave the same picrate as a known sample of N-vinylcarbazole. The monomeric N-vinylcarbazole was polymerized by heating it with a small amount of benzoyl peroxide as a polymerization catalyst.

*Example 2*

N-(β-acetoxyethyl) carbazole together with nitrogen gas as a diluent was passed through a quartz tube maintained at about 550° C. The tube was the same as that used in Example 1 with the exception that it was packed with glass wool. The advantage of the diluent gas, specifically nitrogen, is that it minimizes undesirable side reactions and facilitates the flow of the ester through the packed tube. The procedure was substantially the same as that described under Example 1.

N-vinylcarbazole, melting point 63.5°–66° C., was obtained upon recrystallization of the condensate containing mainly N-vinylcarbazole from a 95% ethyl alcohol solution. A picrate of the pure N-vinylcarbazole melted at 185° C., which is the same melting point as that of a picrate of a known sample of N-vinylcarbazole. The monomer polymerized readily to a high molecular weight polymer, using boron fluoride as a polymerization catalyst.

*Example 3*

N-(β-n-butyroxyethyl) carbazole, which was produced as described in Example 3 of our application Serial No. 631,211, likewise was pyrolyzed to yield N-vinylcarbazole as described in the preceding example. In this case, however, pyrolysis was effected at a temperature of the order of 500° C.

It will be understood, of course, by those skilled in the art that our invention is not limited to the specific esters named in the above illustrative examples nor to the particular temperature or range of temperature therein mentioned. Thus, instead of N-(β-acetoxyethyl) carbazole or N-(β-n-butyroxyethyl) carbazole, we may use N-(β-phenyl-acetoxyethyl) carbazole, N-(β-propionoxyethyl) carbazole or N-(β-isobutyroxyethyl) carbazole. Likewise, instead of employing the particular temperatures given in the examples, we may use lower or higher temperatures, for instance a temperature as low as about 450° C. or as high as about 750° C.

What we claim as new and desire to secure by Letters Patent of the United States is:

1. The method of preparing N-vinylcarbazole which comprises pyrolyzing a compound corresponding to the general formula

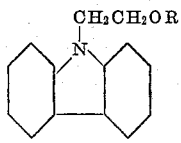

where R represents a member of the class consisting of acetyl, phenylacetyl, propionyl, butyryl and isobutyryl radicals by heating said compound at a temperature within the range of about 450° C. to about 750° C.

2. The method of preparing N-vinylcarbazole which comprises pyrolyzing N-(β-acetoxyethyl) carbazole by heating the same at a temperature within the range of about 450° C. to about 750° C.

3. The method of preparing N-vinylcarbazole which comprises pyrolyzing an N-(β-butyroxyethyl) carbazole by heating the same at a temperate within the range of about 450° C. to about 750° C.

4. The method of preparing N-vinylcarbazole which comprises heating N-(β-acetoxyethyl) carbazole at a temperature within the range of about 575° to about 600° C.

5. The method of preparing N-vinylcarbazole which comprises pyrolyzing N-(β-acetoxyethyl) carbazole by passing the same admixed with an inert gaseous diluent through a reaction zone maintained at a temperature within the range of about 575° to about 600° C.

6. The method of preparing N-vinylcarbazole which comprises heating a mixture of N-(β-acetoxyethyl) carbazole and an inert gaseous diluent at a temperature of about 575° to about 600° C.

7. The method of preparing N-vinylcarbazole which comprises heating N-(β-acetoxyethyl) carbazole admixed with nitrogen at a temperature of about 575° to about 600° C.

HARRY F. MILLER.
RALPH G. FLOWERS.

REFERENCES CITED

The following references are of record in the file of this patent:

UNITED STATES PATENTS

| Number | Name | Date |
| --- | --- | --- |
| 2,378,551 | Hentrich | June 19, 1945 |

FOREIGN PATENTS

| Number | Country | Date |
| --- | --- | --- |
| 256,757 | Germany | Feb. 20, 1913 |

OTHER REFERENCES

Fischer-Orth., "Die Chemie des Pyrrols," Edwards Bros. Inc., Ann Arbor, Mich. (1943), vol. I, page 143. (Copy in Division 15.)